United States Patent [19]
Kieninger

[11] Patent Number: 4,848,977
[45] Date of Patent: Jul. 18, 1989

[54] CUTTER HEAD

[75] Inventor: Walter Kieninger, Lahr, Fed. Rep. of Germany

[73] Assignee: Entwicklungszentrum fur Zerspanungstechnik, Lahr, Fed. Rep. of Germany

[21] Appl. No.: 164,520

[22] Filed: Mar. 7, 1988

[30] Foreign Application Priority Data

Mar. 12, 1987 [DE] Fed. Rep. of Germany ....... 3708034

[51] Int. Cl.$^4$ ............................ B23C 5/24; B23C 5/06
[52] U.S. Cl. ........................................ 407/39; 407/46; 407/76; 407/89
[58] Field of Search ...................... 407/36, 37, 38, 39, 407/40, 41, 44–48

[56] References Cited

U.S. PATENT DOCUMENTS

| | | | |
|---|---|---|---|
| 1,050,455 | 1/1913 | Harrold | 407/37 |
| 3,882,582 | 5/1975 | Williams | 407/37 |
| 4,547,100 | 10/1985 | Naccarato et al. | 407/39 |
| 4,623,284 | 11/1986 | Greiff | 407/41 |
| 4,627,771 | 12/1986 | Kieninger | 407/39 |

FOREIGN PATENT DOCUMENTS 0042667 12/1981 European Pat. Off. .
3140905 10/1981 Fed. Rep. of Germany .

Primary Examiner—Frederick R. Schmidt
Assistant Examiner—Jack Lavinder
Attorney, Agent, or Firm—Christie, Parker & Hale

[57] ABSTRACT

In known cutter heads, the centrifugal forces occurring at high rotational speeds may cause the occurrence of dilatations permitting the cutting edges of the cutting tools to shift from their adjusted positions. An object of the invention is the provision of a cutter head capable of being accurately and reliably adjusted for operation also at high rotational speeds.

According to the invention, a clamping wedge 13 is provided with a skewed clamping surface 21b adapted to cooperate with a contact surface 21a of a cutter blade carrier 2 for clamping it in a groove 20 of a mounting body 1. The invention also proposes the provision of a prism wedge clamping system 10 for supporting the cutter head carrier 2 in the radial direction relative to the mounting body 1.

16 Claims, 6 Drawing Sheets

CUTTER HEAD

FIELD OF THE INVENTION

The present invention relates to a cutter head having a substantially cylindrical mounting body having its periphery formed with a plurality of grooves opening at its end face and part of its peripheral surface and containing each a cutter blade carrier carrying a cutter blade, an axially displaceable radial adjustment wedge disposed to the rear of said cutter blade carrier as viewed in the circumferential direction of rotation with its active surfaces contacting said cutter blade carrier and said mounting body, an axial adjustment wedge disposed axially rearward of said cutter blade carrier for radial displacement by means of a differential screw, and a radially adjustable clamping wedge disposed forward of said cutter blade carrier as viewed in the circumferential direction of rotation.

BACKGROUND OF THE INVENTION

Cutter heads of the type defined above are largely employed as milling tools in the metal processing industry and may be operable at widely different rotary speeds, depending on the material to be cut and the type of the cutter blades employed. In a cutter head of this type it is essential that the cutter blades employed be adjustable with the highest precision with regard to the position of their cutting edges relative to the mounting body of the cutter head at all rotary speeds for which the cutter head is intended. Particularly for integrated manufacturing system with automatic process monitoring, automatic tool change and automatic wear monitoring it is essential that the cutter blades be fixedly retained in their positions relative to the mounting body during the cutting operation. This is of particular importance in the case of high-speed milling machines operating at high rotational speeds as a result of which the various fastener and adjustment elements of the cutter head are subjected to extremely strong forces, particularly as regards the centrifugal forces created by the high rotational speeds.

SUMMARY OF THE INVENTION

It is an object of the invention to provide a cutter head of the type defined in the introduction, which is of simple construction and permits the cutting tools to be adjusted relative to the mounting body in a simple manner and to be accurately secured at fixed positions so as to offer a high degree of safety and reliability in the presence of high rotational speeds or extremely strong cutting forces.

In one embodiment of the invention, this object is attained by the provision that the clamping wedge and the cutter blade carrier are formed with mutually engageable contact surfaces for clamping the cutter blade carrier in the direction of the axially rearward, radially inward, and in the direction of rotation rearward portion of the groove, said contact surfaces being inclined relative to a plane extending through the axis of rotation of the mounting body, so that the center axis of the mounting body passes through the imaginary extensions of the contact surfaces.

In another embodiment of the invention, the objective attained is the provision that a prism wedge clamp system is disposed in the groove radially rearwards of the cutter blade carrier.

The invention offers a number of substantial advantages over prior art. Whereas in the case of known cutter heads, as for instance the one known from DE-OS No. 34 41 821, the clamping of the individual parts of the cutter head required for the mounting and adjustment of the cutting tool or cutting blade was mainly directed to the purpose of preventing the pre-adjusted position of the cutting tools or cutter blades relative to the mounting body from being inadvertently changed under static conditions, the solution of the problem underlying the invention offers the possibility of preventing the adjustment of the cutter tools or cutter blades in the cutter head from being altered even when the cutter head is rotated at high speeds during the milling operation. These high rotational speeds, which in the case of smaller tool diameters may attain a magnitude of up to 15,000 upm, result in a not inconsiderable increase of the centrifugal forces. This increase again results in a considerable dilatation of the various contact areas between the cutter blade, the cutter blade carrier, the adjustment wedges and the clamping elements. This dilatation permits the cutter tools or cutter blades to deviate from their positions, which has usually been adjusted to an accuracy within the $\mu$m range, and may under unfavourable conditions also permit the cutter blade carriers to be excited to vibrate within the grooves of the mounting body, resulting in undesirable chatter marks or other irregularities on the surface to be milled. The solutions proposed by the present invention are effective to guard against this dilatation or loosening effect by the provision that the cutter blade carrier is subjected to an additional clamping force acting mainly in the direction of the centrifugal forces generated at high rotational speeds. In the cutter head according to the invention, the magnitude of this clamping force may be selected so that the centrifugal forces occurring at high rotational speeds and the dilatations caused thereby are taken into account and/or compensated.

It has been found to be particularly advantageous that the clamp wedge is effective to exert a clamping force on the cutter blade carrier in the direction of the axially rearward, radially inward, and in the direction of rotation rearward portion of the groove. This clamping force results in a particularly effective clamping of the cutter blade carrier to thereby prevent it from being flung out of the groove at higher rotational speeds. In addition, the clamping wedge employed according to the invention is effective to ensure that the cutter blade carrier is kept in optimum contact with the walls of the groove in which it is retained. While in the known cutter head the clamping wedge exerted a clamping force on the cutter blade carrier mainly in the circumferential direction to thereby keep the cutter blade carrier in optimum contact with the rear wall of the groove as viewed in the direction of rotation, the cutter blade carrier of the cutter head according to the invention is clamped into close contact not only with the rear wall of the groove as viewed in the direction of rotation, but also with the axialle rearward and radially inner wall portions of the groove. In this manner it is ensured that the cutter blade carrier is in contact with the mounting body over the greatest possible area. This clamping of the cutter blade carrier has been found to be particularly advantageous not only for high-speed milling operations, but also for employ of the cutter head at lower rotational speeds.

A particularly advantageous solution of the problen underlying the invention includes the provision of a prism wedge clamp system disposed in the groove rearwards of the cutter blade carrier in the radial direction. The provision of this prism wedge clamping system ensures that the radially rear portion of the cutter blade carrier is supported on the wall of the groove over the greatest possible area. This clamping force, which preferably acts substantially in the radial direction, ensures that the cutter blade carrier will not be loosened in the groove due to dilatation of the main functional portions of the mounting body as might otherwise be caused by high rotational speeds, great centrifugal forces or strong cutting forces. The clamping forces exerted by the prism wedge clamping system also advantageously result in close contact of the cutter blade carrier with the adjustment wedges, particularly the radial adjustment wedge. Suitable control of the clamping force exerted by the prism wedge clamping system thus not only permits a particularly close contact of the cutter blade carrier with the walls of the groove to be achieved, but also enables the dilatation of the resiliently deformable portions of the mounting body caused by centrifugal forces to be influenced by subjecting the respective portions of the mounting body and/or the cutter blade carrier to resilient biasing forces in the same manner as in the case of the clamping wedge described above. Since the displacement of the cutting edges of the cutter blades possibly caused by these biasing forces is predictable, it is thus possible according to the invention to avoid the danger of higher rotational speeds of the cutter head resulting in a loosening of the cutter blade carrier and thus in the disadvantages described above.

In a particularly advantageous embodiment of the invention the cutter head is provided with both said clamping wedge and said prism wedge clamping system. In this manner it is ensured that the cutter blade carrier is in close contact with the walls of the groove over the greatest possible area. This embodiment thus results in a combination of the advantages of the two solutions according to the invention as described above.

The contact surfaces between the clamping wedge and the cutter blade carrier are advantageously of planar configuration. This results in reduced manufacturing costs on the one hand, and on the other, in a very evenly distributed transmission of the pressure created by the clamping force.

In a particularly advantageous embodiment, the clamping wedge is of substantially frustoconical shape converging towards its radially inner end portion, and is adjustable relative to the mounting body by means of an excentrically positioned differential screw, the clamping wedge being provided with a wedge-shaped planar surface portion acting as a contact surface for cooperation with the cutter blade carrier. This embodiment on the one hand permits the clamping wedge to be manufactured in a particularly cost-effective manner by using a conventional machine tool. On the other hand this embodiment permits the clamping wedge to be very accurately adjusted, since the differential screw is selectively operable to displace the clamping wedge in opposite directions. The inclination angle of the planar surface portion and the included angle of the frustoconical shape of the clamping wedge permit the forces to be exerted by the clamping operation to be predicted and optimized in a particularly simple manner.

The cutter blade carrier is advantageously so configured that its contact surface cooperating with the clamping wedge extends from a circumferentially and axially rearward location towards a circumferentially and axially forward location. It is thus ensured in a particularly simple manner that the clamping wedge is effective to keep the cutter blade carrier in close contact with the walls of the groove in the mounting body as described above.

In a particularly suitable and advantageous embodiment, the prism wedge clamping system comprises three prisms, a first prism with its apex directed radially inwards and its base surface disposed opposite the cutter blade carrier, and a second and a third prism disposed with their base surfaces in contact with a radially inner bottom portion of the groove and other surface portions thereof in contact with the first prism and the cutter blade carrier, the clamping operation of the prism wedge clamping system being carried out by means of a clamping screw mounted in the cutter blade carrier and acting on the first prism. This construction offers the advantage that the clamping screw is readily accessible form outside for simple adjustment. The composition of the prism wedge clamping system of three separate members is effective to evenly distribute the clamping force exerted by the clamping screw to thereby prevent the cutter blade carrier from being tilted in the groove of the mounting body by the clamping action of the prism wedge clamping system. A further advantage of this construction of the prism wedge clamping system derives from the fact that the first prism transmits the clamping force exerted thereon by the clamping screw to the other two prisms. It is thus ensured that the clamping force acts to displace the other two prisms to thereby contribute to a particularly close contact of the cutter blade carrier with the walls of the groove.

The prism wedge clamping system is advantageously disposed in a radially inwards opening groove of the cutter blade carrier. In this case the prism wedge clamping system does not require the dimensions of the groove in the mounting body to be modified, so that it is possible to equip already existing cutter heads with the prism wedge clamping system according to the invention by merely replacing the cutter blade carriers. It is further advantageously ensured that the prism wedge clamping system can be mounted in a preadjusted state together with the cutter blade carrier when assembling the cutter head. This results in a reduction of the assembly time and thus of the costs of the assembling operation, and prevents the prism wedge clamping system from being incorrectly mounted to thereby ensure reliable operation of the cutter head.

In a particularly advantageous embodiment the first prism is of equilateral configuration and/or has its wedge surfaces including an angle of 90°. This configuration results in a evenly distributed transmission of forces to the second and third prisms and permits economical manufacture of the prism system.

The contact surfaces between the second and third prisms and the first prism preferably extend at a greater angle relative to the radially inward bottom portion of the groove than the contact surfaces cooperating with the cutter blade carrier. On displacement of the second and third prisms during the clamping operation by the action of the first prism this results in an even distribution of forces and in partisularly desirable displacement strokes of the three prisms relative to one another, and of the second and third prisms relative to the cutter blade carrier, since a relatively important displacement of the first prism results in an only relatively small lateral displacement of the second and third prisms.

In a particularly advantageous embodiment of the cutter head, the radial adjustment wedge is adjustable by means of a differential screw mounted in the radial adjustment screw and in the mounting body, the axis of the differential screw being inclined relative to the axis of rotation of the mounting body and extending parallel to the radially outer edge of the radial adjustment wedge. The differential screw permits the radial adjustment wedge to be pushed into the mounting body and to be retracted therefrom by accurately determined degrees. The described arrangement of the axis of rotation of the differential screw relative to the outer edge of the darial adjustment wedge results in that the adjustment of the radial adjustment wedge requires only relatively small forces, since these forces act only in the longitudinal direction of the differential screw, and not transversely of the active adjustment edge of the wedge.

In a further advantageous embodiment of the cutter head according to the invention, the cutter blade is preferably mounted on a cutter blade cage itself mounted on the cutter blade carrier. This arrangement permits the cutting edge or edges of the cutter blade to be adjusted not only by means of the radial and axial adjustment wedges, but also by a rotation of the cutter blade which may be required for the purpose of fine adjustment.

The cutter head according to the invention is particularly designed to absorb strong radial cutting forces and may therefore be employed for heavy-duty cutting operations. The configuration and function of the clamping wedge according to the invention permit the cutter blade carrier to be reliably and securely clamped both in radial and axial directions. The prism wedge clamping system is advantageously effective to ensure that strong radial forces occurring particularly in the course of heavy-duty cutting operations can be transmitted to the mounting body without shifting of the cutter blade carrier or the cutting blade mounted thereon.

Embodiments of the invention shall now be described by way of example with reference to the accompanying drawings, wherein:

DETAILED DESCRIPTION

Figure 1:
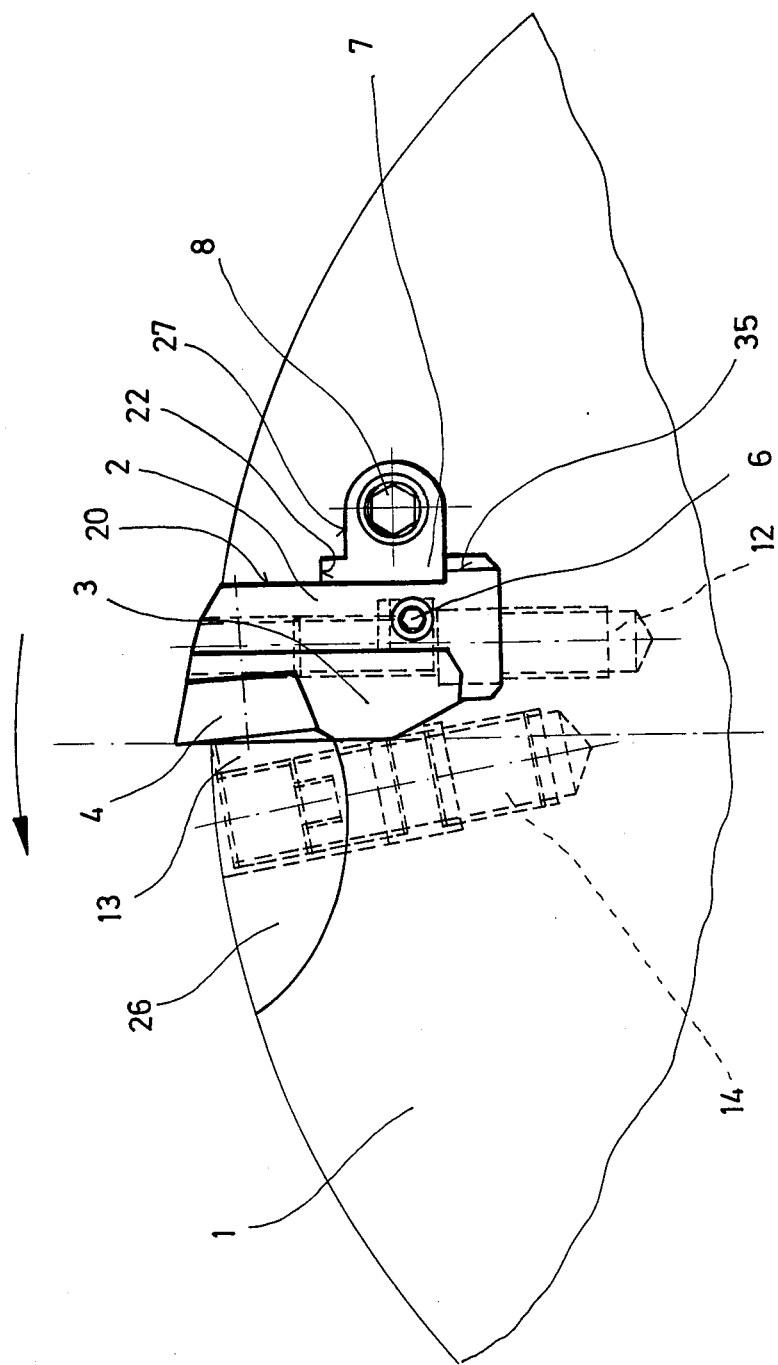
FIG. 1 shows a bottom plan view of part of a cutter head according to the invention.

The cutter head shown in a partial bottom view in FIG. 1 has a substantially cylindrical mounting body 1 formed with a plurality of grooves 20 opening at its end face and part of its outer peripheral surface. The axial length of each groove 20 is smaller than the height of mounting body 1. The cutter head is rotatable in counterclockwise direction as indicated by an arrow in FIG. 1. Each groove 20, only one of which is shown in FIG. 1, contains a cutter blade carrier 2 with a cutter blade cage 3 and a cutter blade 4 mounted thereon as will be described. The rear wall of groove 20 as viewed in the direction of rotation is formed with a recess 27 for receiving therein a radial adjustment wedge 7 adapted to be adjusted by means of a differential screw 8 mounted in engagement with mounting body 1 and radial adjustment wedge 7. Provided in front of cutter blade 4 as viewed in the direction of rotation is a recess 26 for discharging chips.

Figure 2:
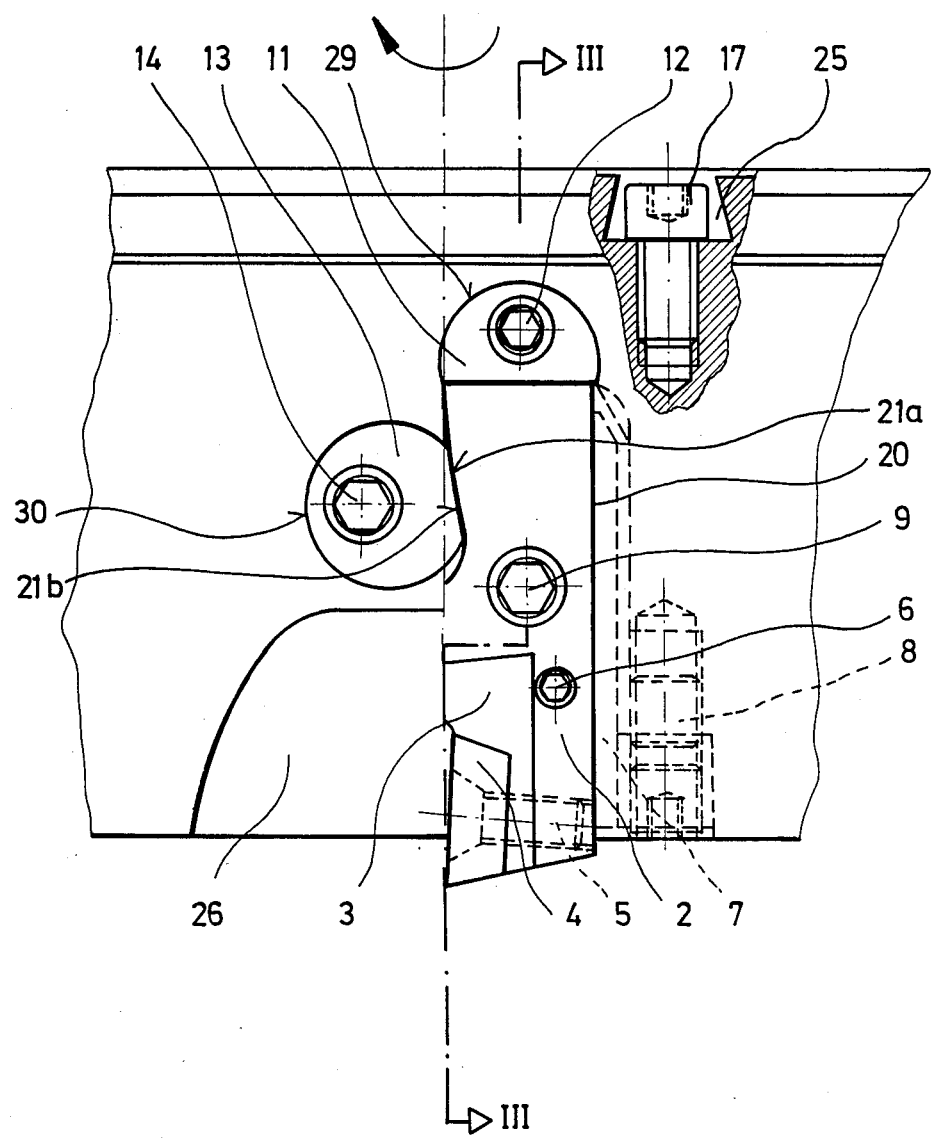
FIG. 2 shows a partial view of a lateral outer peripheral portion of the cutter head of FIG. 1.

FIG. 2 shows a lateral view of a small portion of the periphery of the cutter head of FIG. 1. Rotation of the mounting body about its center axis results in displacement of cutter blade 4 to the left as likewise indicated by an arrow.

Cutter blade 4 is secured to cutter blade carrier 2 and cutter blade cage 3 by means of a fastener screw 5, as will be explained in detail as the description proceeds. From FIG. 2 it is also clearly evident that the axial length of groove 20 is smaller than the axial height of mounting body 1. The axially rearward portion of groove 20 is formed with a recess 29 with an axial adjustment wedge 11 disposed therein. As will be described in detail with additional reference to FIG. 3, axial adjustment wedge 11 is radially adjustable by means of a differential screw 12.

Figure 4:
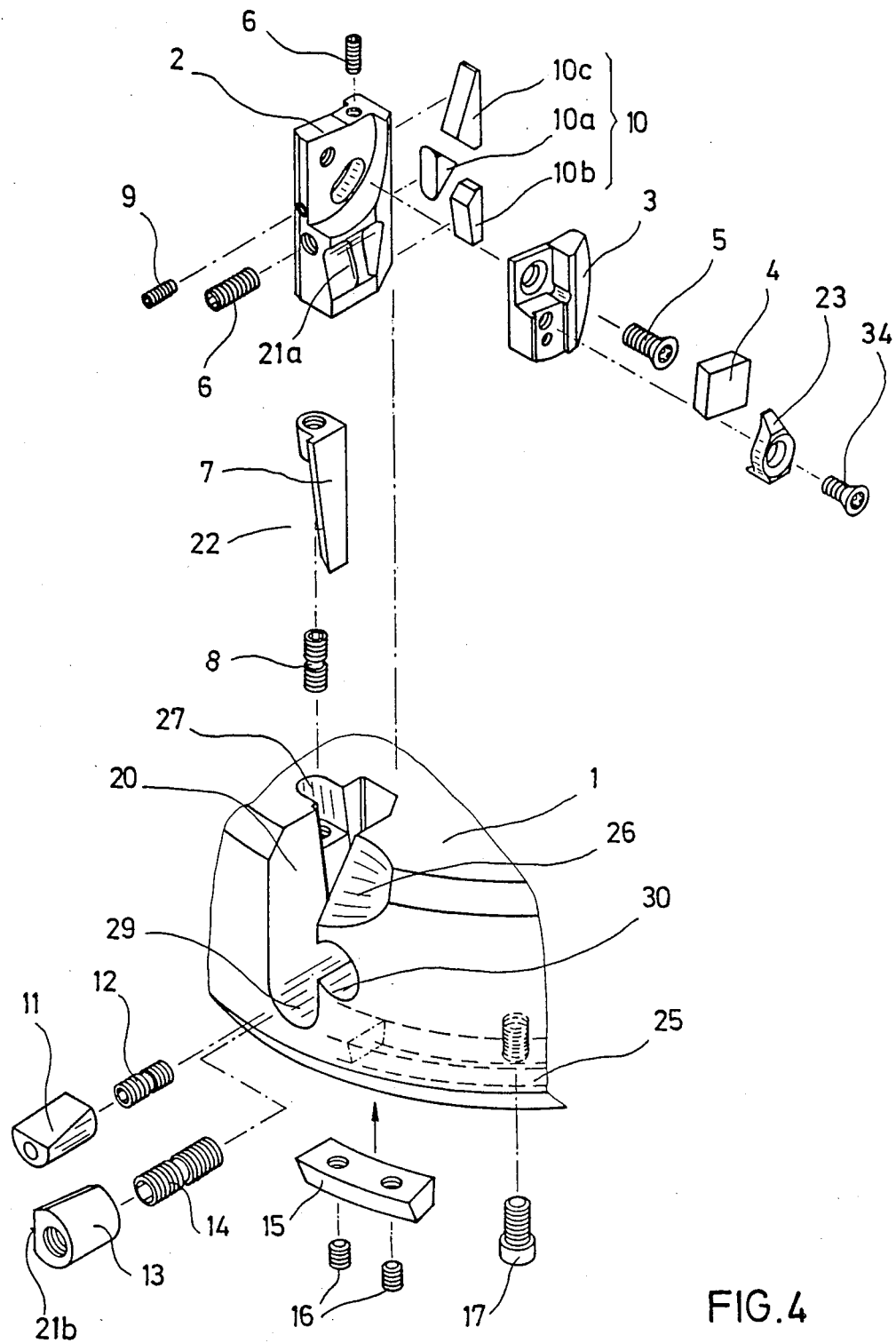
FIG. 4 shows an exploded perspective view of a first embodiment of the invention.
Figure 5:
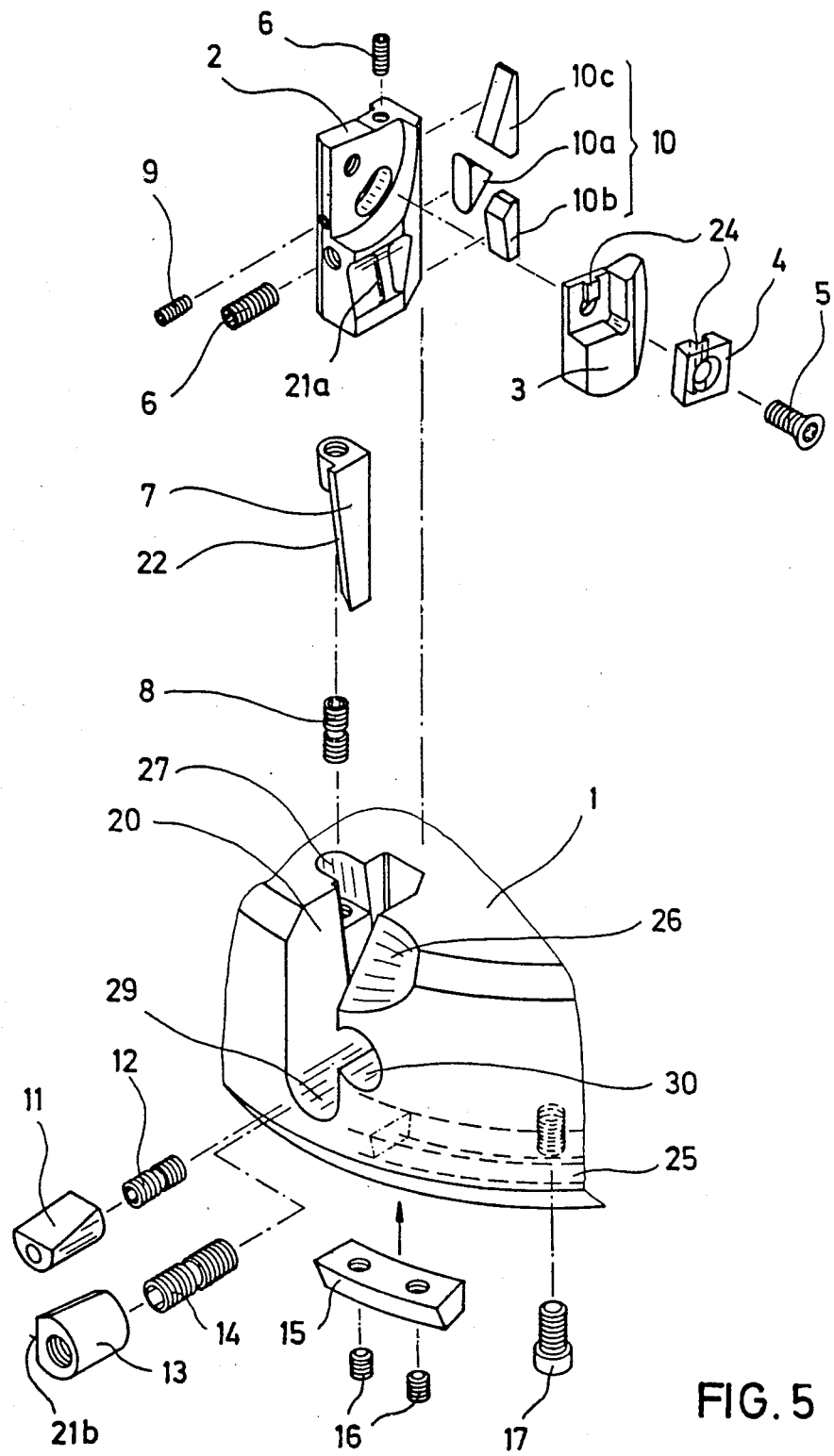
FIG. 5 shows an exploded perspective view of a second embodiment of the invention.
Figure 6:
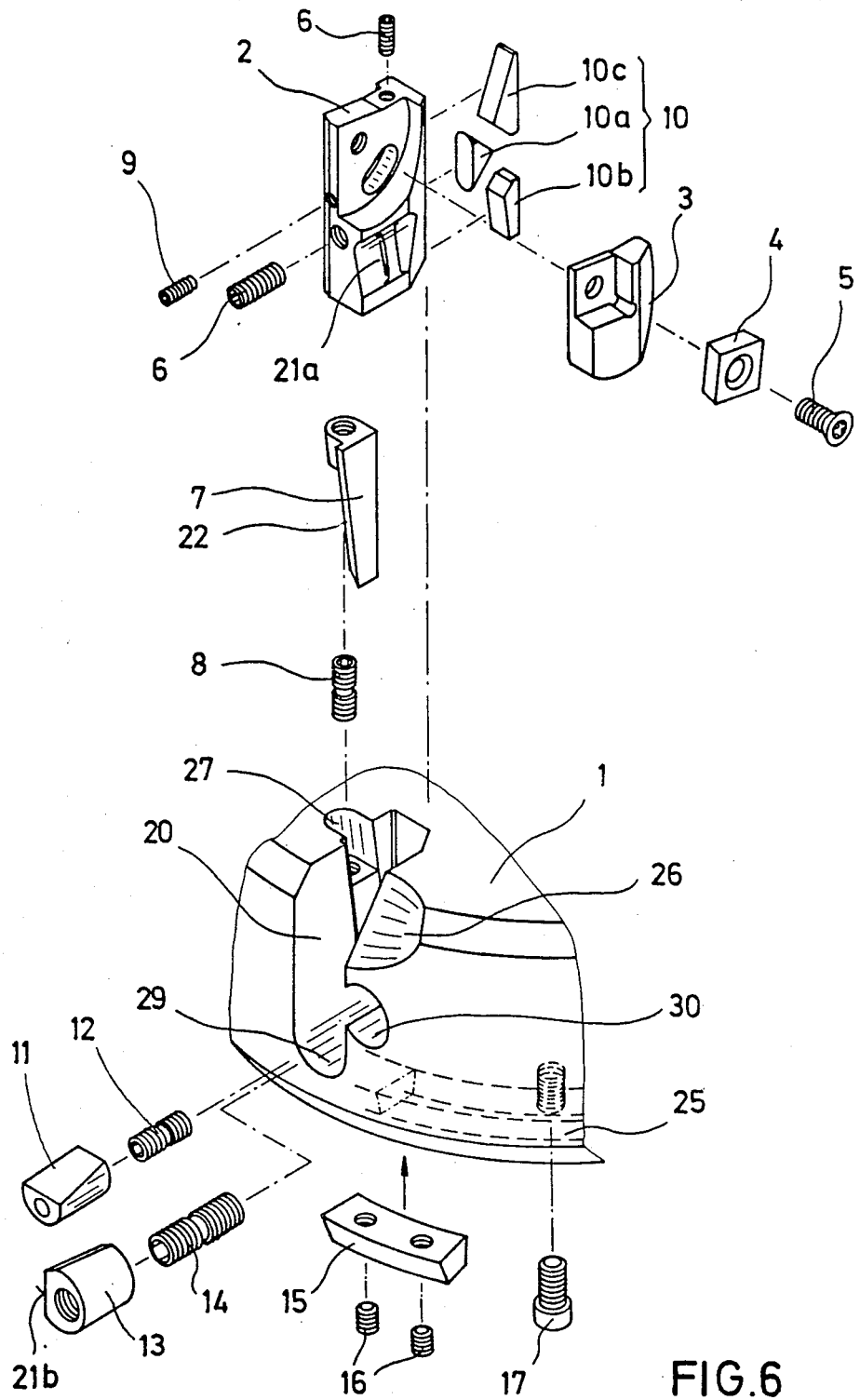
FIG. 6 shows an exploded perspective view of a third embodiment of the invention.

In front of cutter blade carrier 2 as viewed in the direction of rotation, mounting body 1 is formed with a recess 30 communicating with groove 20 and containing a clamping wedge 13 mounted for radial displacement by means of a differential screw 14. Clamping wedge 13 has a contact surface 21b adapted to be engaged with a contact surface 21a of cutter blade carrier 2. As will be explained in detail with reference to FIGS. 4 to 6, clamping wedge 13 is of frustoconical shape. Contact surface 21b extends at an inclined wedge angle relative to the longitudinal axis of differential screw 14. As depicted in FIGS. 4 to 6, contact surface 21a of cutter blade carrier 2 is inclined from its axially rearward portion towards its axially forward portion, so that its axially forward portion is offset towards the center plane of cutter blade carrier 2. Contact surface 21a of cutter blade carrier 2 is additionally inclined so that its radially outer portion is farther away from the center plane of cutter blade carrier 2 than its radially inner portion. Contact surface 21a is thus askew relative to the center axis of mounting body 1.

As shown in detail in FIGS. 4 to 6, contact surface 21a is preferably formed with a substantially strip-shaped raised portion projecting slightly above the remainder of contact surface 21a and adapted to be engaged by clamping wedge 13. The strip-shaped raised portion of contact surface 21a extands substantially parallel to the radially outer edge of contact surface 21a on cutter blade carrier 2. The width of the strip-shaped raised portion may be selected in accordance with prevailing requirements. The provision of this strip-shaped raised portion on contact surface 21a has been found to be particularly advantageous in context with the present invention, in that it prevents dilatation of groove 20 containing cutter blade carrier 2 when tightening clamping wedge 13, since the contact surface pressure between clamping wedge 13 and the strip-shaped raised portion of contact surface 21a is considerably improved.

Also shown in FIG. 2 in dotted lines is radial adjustment wedge 7 with its associated differential screw 8. FIG. 2 further shows one of a pair of adjustment screws 6 by means of which cutter blade cage 3 is rotatable relative to cutter blade carrier 2. Mounted at a central portion of cutter blade carrier 2 is a clamping screw 9 for the actuation of a prism wedge clamping system shwon in detail in FIG. 3. As also shown in FIG. 2 in a sectional illustration rotated about an angle of 90°, a rim portion of mounting body 1 is formed with a circumferential groove 25 with a plurality of balancing bodies 15 mounted therein as shown in detail in FIG. 3. An enlarged portion of groove 25 required for the introduction of balancing bodies 15 is closed by a stop screw 17 as shown in FIG. 2.

Figure 3:
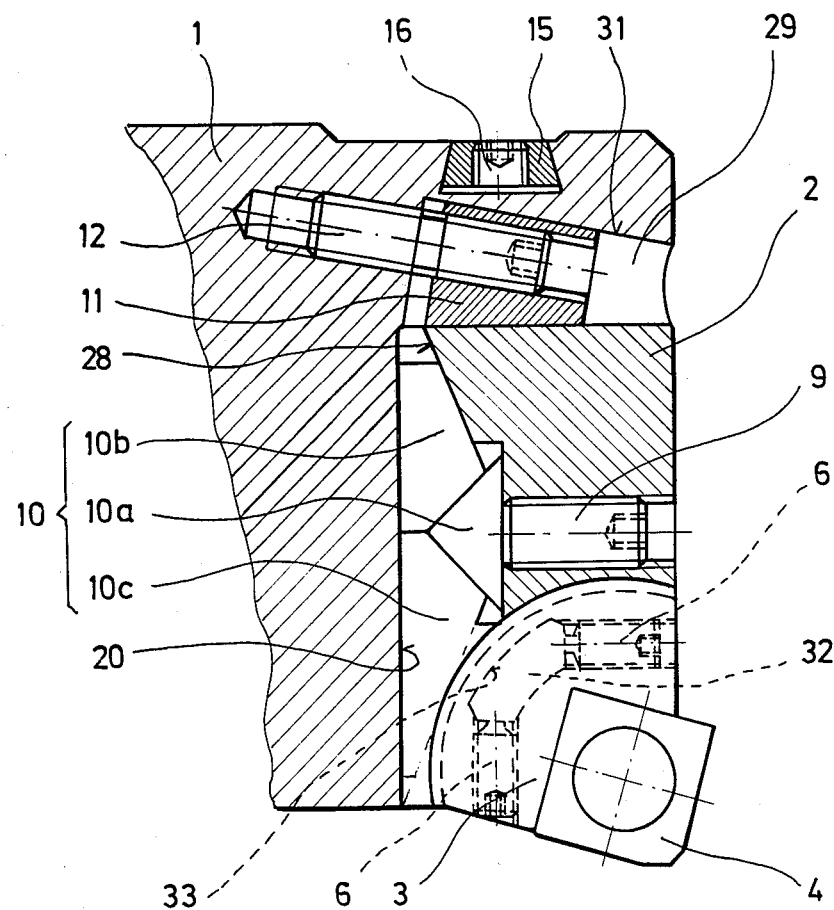
FIG. 3 shows a sectional view taken along the line A—A in FIG. 2.

FIG. 3 shows a sectional view taken along the line A—A in FIG. 2. As clearly shown in this figure, groove 20 extends only over part of the axial height of mounting body 1. Shown at the axially rearward end is the recess 29 with axial adjustment wedge 11 disposed therein. The boundary surface between axial adjustment wedge 11 and cutter blade carrier 2 extends in a plane perpendicular to the center axis of mounting body 1, permitting cutter blade carrier 2 to be radially adjusted, e.g. to the right in FIG. 3, without axial adjustment wedge 11 having to be readjusted. Axial adjustment wedge 11 is displaceable in a substantially radial direction by means of differential screw 12. This substantially radial displacement of axial adjustment 11 results in an axial displacement of cutter blade carrier 2 due to the cooperation of axial adjustment wedge 11 with the just mentioned boundary plane of cutter blade carrier 2 and a wall 31 of recess 29. Differential screw 12 is engaged with respective threaded bores in axial adjustment wedge 11 and mounting body 1 and thus operable to accurately displace axial adjustment wedge 11 in opposite directions.

As further shown in the sectional view of FIG. 3, the radially inner end portion of cutter blade carrier 2 is formed with a groove 28 with the prism wedge clamping system 10 disposed therein. System 10 comprises a first prism 10a facing radially outwards with its bottom portion and having its apex portion directed towards the center axis of mounting body 1. Likewise disposed within groove 28 are a second prism 10b and a third prism 10c in contact with first prism 10a and cutter blade carrier 2 on one side, and with the radially inner wall of groove 20 on the other. Clamping screw 9 extends through a threaded bore of cutter blade carrier 2 and is operable to exert a clamping force on first prism 10a in the direction of second and third prisms 10b and 10c, so that tightening of clamping screw 9 results in the exertion of a radially outwards directed force on cutter blade carrier 2. Prism wedge clamping system 10 is thus effective to ensure that the radially inner end portion of cutter blade carrier 2 is always supported in close contact with the respective wall of groove 20. In cooperation with the action of clamping wedge 13, this results in a biasing clamp force acting on cutter blade carrier 2 to thereby guard against dilatation and loosening phenomena caused by centrifugal forces at high rotational speeds of mounting body 1.

As further shown in FIG. 3, the apex angle of first prism 10a is about 90°, whereas the surfaces of second and third prisms 10b and 10c contacting cutter blade carrier 2 extend at acute angles relative to the radially inner wall of groove 20.

Also shown in FIG. 3 in lateral elevation is cutter blade cage 3 in combination with the two adjustment screws 6 for rotating it about an axis substantially coincident with the axis of rotation of fastener screw 5 of cutter blade 4. As shown in detail in FIGS. 4 to 6, adjustment screws 6 are mounted in respective threaded bores of cutter blade carrier 2 with their inner end portions abutting a stop projection 32 of cutter blade cage 3, the latter being rotatably received in a substantially arcuate recess 33 in cutter blade carrier 2. Adjustment screws 6 are thus selectively or alternately operable for rotating cutter blade cage 3 relative to cutter blade carrier 2.

FIG. 4 shows an exploded perspective view of one embodiment of the cutter head according to the invention. The components of the cutter head shown in this exploded view correspond to the ones described with reference to FIGS. 1 to 3, with the exception of the arrangement for mounting cutter blade 4 on cutter blade cage 3. Particularly clearly illustrated in FIG. 4 is the configuration of axial adjustment wedge 11, clamping wedge 13 and radial adjustment wedge 7. The latter has a radially inner edge extending parallel to the center axis of mounting body 1 and abutting a shoulder 35 of cutter blade carrier 2 likewise extending parallel to the center axis of mounting body 1. A radially outer edge 22 of radial adjustment wedge 7 is engaged with an edge of recess 27, so that axial displacement of radial adjustment wedge 7 results in radial displacement of cutter blade carrier 2. Displacement of radial adjustment wedge 7 is brought about by the operation of differential screw 8 extending substantially parallel to edge 22.

In the embodiment shown in FIG. 4, cutter blade cage 3 is mounted on cutter blade carrier 2 by means of fastener screw 5. Cutter blade 4 is mounted on cutter blade carrier 3 by means of a clamping lever 23 secured to cutter blade cage 3 by means of a screw 34.

The embodiments shown in FIGS. 5 and 6 differ from the one shown in FIG. 4 only by the mounting of cutter blade 4 on cutter blade cage 3. In the embodiment of FIG. 5, cutter blade cage 3 and cutter blade 4 are formed with a slot-and-key connection 24 particularly effective for securing cutter blade 4 against rotation in cutter blade cage 3. In this embodiment the mounting of cutter blade 4 is accomplished by means of fastener screw 5 also serving for mounting cutter blade cage 3 on cutter blade carrier 2. It goes without saying that in all of the embodiments described fastener screw 5 has to be loosened for permitting cutter blade cage 4 to be adjusted relative to cutter blade carrier 2, and to be tightened after such adjustment. In the embodiment depicted in FIG. 6, the slot-and-key connection 24 shown in FIG. 5 has been eliminated.

Shown in each of FIGS. 4 to 6 is a balancing body 15 adapted to be displaceably received in groove 25. The cutter head is balanced by displacing balancing body 15 to a suitably determined position, wherat it is fixed by means of worm screw 16.

The invention is not restricted to the embodiments shown and described by way of example. It is thus possible within the scope of the invention to employ the described clamping wedge component and/or the described prism wedge clamping system in cutter heads in which the radial and/or axial adjustment of the cutting blades or cutting tools is accomplished in any manner other than described above. Neither is the invention restricted to the described configuration of the clamping wedge and the associated contact surface of the cutter blade carrier, it being also possible to arrange the clamping wedge in another manner and to modify the contact surfaces between the clamping wedge and the cutter blade carrier within the scope of the invention. The prism wedge clamping system is not either restricted to the embodiment shown, it being possible within the scope of the invention to provide additional prisms and/or to mount the prism wedge clamping system at another location and/or at a different angular orientation.

I claim:

1. A cutter head having a substantially cylindrical mounting body having its periphery formed with a plurality of grooves opening at its end face and part of its peripheral surface and containing each a cutter blade carrier carrying a cutter blade, an axially displaceable radial adjustment wedge disposed behind said cutter blade carrier as viewed in the circumferential direction of rotation with its active surfaces contacting said cutter blade carrier and said mounting body, an axial adjustment wedge disposed axially behind said cutter blade carrier for radial displacement by means of a differential screw, and a radially adjustable clamping wedge disposed in front of said cutter blade carrier as viewed in the circumferential direction of rotation, characterized in that said clamping wedge (13) engages said cutter blade carrier (2) via a pair of inwardly inclined slope contact surfaces (21A, 21B), whereas said cutter blade carrier (2) is supported at the bottom side of the groove (20) by means of a pre-tension multiprism wedge clamp assembly (10) with the cutter blade (4) being supported on said cutter blade carrier (2) by means of a rotatable cutter blade cage (3).

2. A cutter head according to claim 1, characterized in that said contact surfaces (21a, 21b) between said clamping wedge (13) and said cutter blade carrier (2) are of planar configuration.

3. A cutter head according to claim 2, characterized in that said clamping wedge (13) is of substantially frustoconical configuration converging radially inwards and adjustable relative to said mounting body (1) by means of an eccentrically disposed differential screw (14), and is formed with a wedge-shaped flat surface portion acting as said contact surface (21b) for engaging said cutter blade carrier (2).

4. A cutter head according to claim 3, characterized in that said contact surface (21a) of said cutter blade carrier (2) extends from a circumferentially and axially rearward location towards a circumferentially and axially forward location.

5. A cutter head according to claim 1, characterized in that said prism wedge clamp system (10) comprises three prisms (10a, 10b, 10c), a first prism (10a) being disposed with its apex facing radially inwards and its base surface directed towards said cutter blade carrier (2), a second and a third prism (10b, 10c) being disposed with their base surfaces contacting a radially inner bottom portion of said groove (20), said second and third prisms (10b, 10c) being also in contact with said first prism (10a) and said cutter blade carrier (2), the clamping operation of said prism wedge clamp system (10) being carried out by means of a clamp screw (9) mounted in said cutter blade carrier (2) and acting on said first prism (10a).

6. A cutter head according to claim 5, characterized in that said prism wedge clamp system (10) is disposed in a radially inwards opening groove of said cutter blade carrier (2).

7. A cutter head according to claim 5, characterized in that said first prism (10a) is of equilateral shape.

8. A cutter head according to claim 5, characterized in that the wedge surfaces of said first prism (10a) include an angle of 90°.

9. A cutter head according to claim 5, characterized in that the contact surfaces between said second and third prisms (10b, 10c) and said first prism (10a) are inclined at a greater angle with respect to the radially inner bottom portion of said groove (20) than the contact surfaces contacting said cutter blade carrier.

10. A cutter head according to claim 1, characterized in that said radial adjustment wedge (7) is adjustable by means of a differential screw (8) mounted in said radial adjustment wedge (7) and in said mounting body (1), the axis of said differential screw (8) being inclined relative to the axis of rotation of said mounting body (1) and extending parallel to the radially outer edge (22) of said radial adjustment wedge (7).

11. A cutter head according to claim 1, characterized in that said cutter blade cage (3) and said cutter blade (4) are mounted on said cutter blade carrier (2) by means of a fastening screw (5) for arcuate displacement in unison about the axis of rotation of said fastener screw (5).

12. A cutter head according to claim 11, characterized in that said cutter blade (4) and said cutter blade cage (3) are formed with engageable locking elements.

13. A cutter head according to claim 12, characterized in that said engageable locking elements are formed as a key and slot combination (24).

14. A cutter head according to claim 1, characterized in that said cutter blade cage (3) is mounted on said cutter blade carrier (2) by means of a fastener screw (5), and said cutter blade (4) is adapted to be fixed in position by means of a clamping lever (23) mounted on said cutter blade cage (3), said cutter blade cage (3) being rotatable about the axis of said fastener screw (5).

15. A cutter head according to claim 1, characterized in that the rotary displacement of said cutter blade cage (3) is adapted to be brought about by means of two screws (6) mounted on said cutter blade carrier (2) and adapted to act on a projection of said cutter blade cage (3).

16. A cutter head according to claim 1, characterized in that said mounting body (1) is provided with at least one groove (25) for displaceably mounting balancing bodies (15) therein.

* * * * *

UNITED STATES PATENT AND TRADEMARK OFFICE
CERTIFICATE OF CORRECTION

PATENT NO. : 4,848,977
DATED : July 18, 1989
INVENTOR(S) : Walter Kieninger

It is certified that error appears in the above-identified patent and that said Letters Patent is hereby corrected as shown below:

```
Column 2, line 17, change "upm" to -- rpm --.
Column 2, line 17, change the phrase "result in a not" to
                   -- do not result --.
Column 2, line 59, change "axialle" to -- axially --.
Column 2, line 65, change "employ" to -- employment --.
Column 3, line 50, change "excentrically" to
                   -- eccentrically --.
Column 4, line 19, change "form" to -- from --.
Column 4, line 53, change "a" to -- an --.
Column 4, line 63, change "partisularly" to
                   -- particularly --.
Column 4, line 67, change "in an only" to -- only in a --.
Column 5, line 13, change "darial" to -- radial --.
Column 6, line 52, change "extands" to -- extends --.
Column 7, line 4, change "shwon" to -- shown --.
Column 8, line 52, change "wherat" to -- whereat --.
```

Signed and Sealed this

Twenty-fourth Day of July, 1990

*Attest:*

HARRY F. MANBECK, JR.

*Attesting Officer*   *Commissioner of Patents and Trademarks*